United States Patent

Heck et al.

[11] Patent Number: 5,891,503
[45] Date of Patent: Apr. 6, 1999

[54] PROCESS FOR THE PREPARATION OF A FOODSTUFF BY EXTRUSION

[75] Inventors: Ernst Heck, Vufflens-La-Ville; Osvaldo Geromini; Werner Pfaller, both of Orbe, all of Switzerland

[73] Assignee: Nestec S.A., Vevey, Switzerland

[21] Appl. No.: 883,764

[22] Filed: Jun. 27, 1997

[30] Foreign Application Priority Data

Jun. 30, 1996 [EP] European Pat. Off. ............. 96201793

[51] Int. Cl.⁶ .................................................. A23P 1/00
[52] U.S. Cl. ......................... 426/516; 426/448; 426/523
[58] Field of Search ................................. 426/516, 523, 426/448, 449; 425/204

[56] References Cited

U.S. PATENT DOCUMENTS

| | | | |
|---|---|---|---|
| 2,836,851 | 6/1958 | Holt | 18/12 |
| 3,861,287 | 1/1975 | Manser | 99/348 |
| 4,431,311 | 2/1984 | Kolossow | 366/79 |
| 4,861,615 | 8/1989 | Wiedmann | 426/631 |
| 5,227,111 | 7/1993 | Brangers et al. | 264/211.23 |
| 5,385,746 | 1/1995 | De Almeida | 426/448 |
| 5,472,733 | 12/1995 | Degady et al. | 426/516 |

*Primary Examiner*—George Yeung
*Attorney, Agent, or Firm*—Pennie & Edmonds LLP

[57] ABSTRACT

Process for the preparation of a foodstuff by extrusion, in which a food substance is introduced into, mixed and cooked in a first section of a twin-screw extruder, the cooking of the mass obtained in a cooker connected up in parallel with the first section and a second section of the extruder dynamically separated from the first is prolonged, and the cooked mass is reintroduced into the second section, the mass is extruded by passing it through a die and the extruded product is cut.

15 Claims, 3 Drawing Sheets

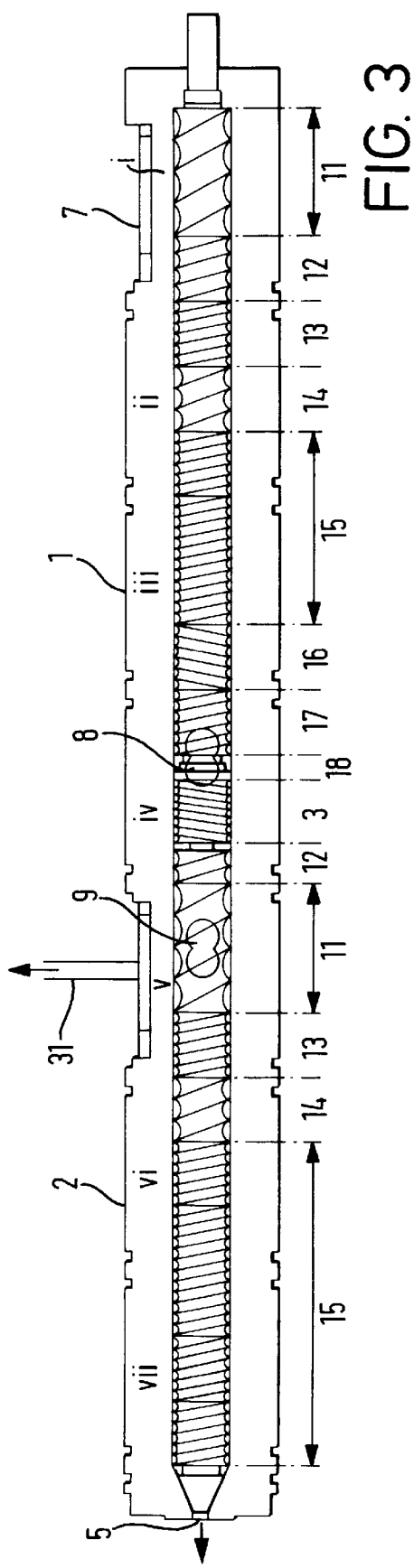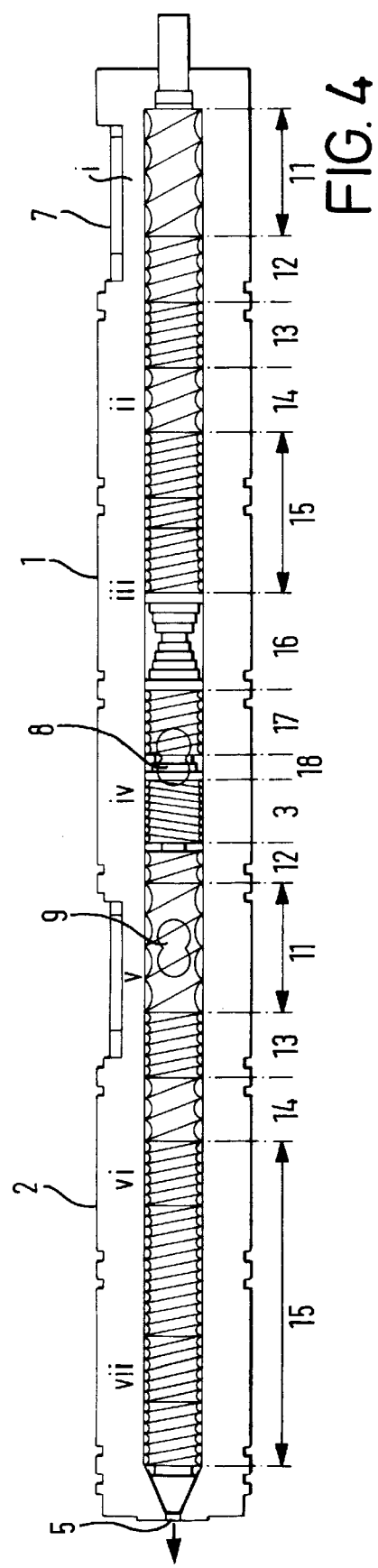

PROCESS FOR THE PREPARATION OF A FOODSTUFF BY EXTRUSION

TECHNICAL FIELD

The subject of the present invention is a process for the preparation of a foodstuff by extrusion and an installation for carrying out the process.

BACKGROUND ART

EP0262300 describes a process and an installation for producing a mass of chocolate, which involve the use of an extruder split into zones in which the successive steps of sterilizing and deodorising pieces of raw beans using pressurised steam, roasting the pieces of beans having after reduced them to a powder in a hammer mill connected in parallel with two zones which are separated by an element of screw with a flight of opposite hand, adding and mixing powdered sugar to the roasted bean powder, adding cocoa butter, and finally conducting the steps of mixing and extrusion.

SUMMARY OF THE INVENTION

The object of the present invention is to propose a process and an installation envisaging an effective use of a twin-screw extruder which is particularly well-suited to the preparation of cooked-extruded foodstuffs with a good cooked flavor.

To this end, in the process according to the present invention, a food substance is introduced into, mixed and cooked in a first section of a twin-screw extruder, the cooking of the mass obtained in a cooker connected up in parallel with the first section and a second section of the extruder dynamically separated from the first is prolonged, and the cooked mass is reintroduced into the second section, the mass is extruded by passing it through a die and the extruded product is cut.

Likewise, the installation according to the present invention comprises a twin-screw extruder split into two distinct sections by a dynamic-separation device, a cooker connected in parallel with the first section and the second section, a die and a cutting device.

Such a process and such a piece of equipment effectively allow efficient use of a twin-screw extruder which use is particularly well suited to the preparation of cooked-extruded foodstuffs with a good cooked flavor.

BRIEF DESCRIPTION OF THE DRAWINGS

The device and process of the present invention are more fully understood with reference to the appended drawing figures, wherein:

FIG. 3 is an illustration of the geometry of the screws of the installation of FIG. 1;

FIG. 4 is an illustration of the geometry of the screws of the installation of FIG. 2.

DETAILED DESCRIPTION OF THE PREFERRED EMBODIMENTS

Figure 1:
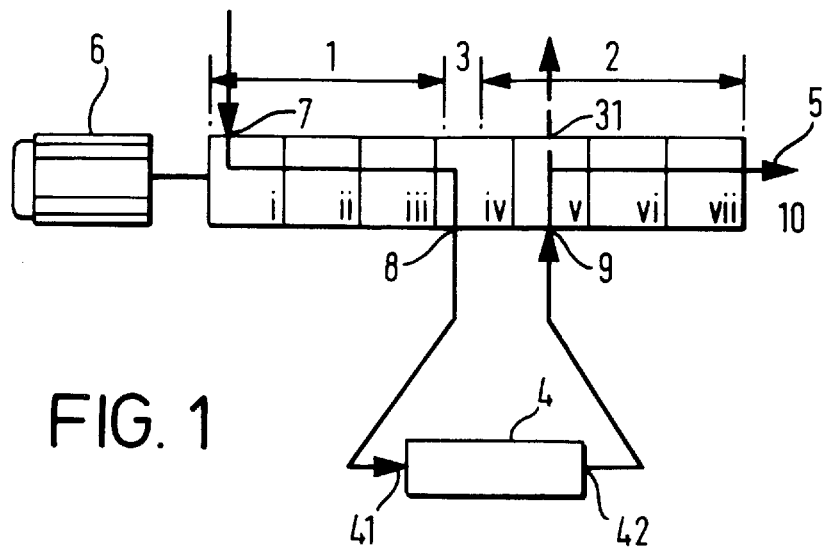
FIG. 1 is a diagram of one embodiment of the invention, where the installation is used to prepare expanded products.

In this description, the expression "food substance" covers all the components introduced together or separately, at the same time or in succession, into the first section of the extruder and processed all together at least in a part of this section.

In order to carry out the current process, it is possible to start with food substances from which it is possible to produce, by extrusion, the widest possible range of foodstuffs such as breakfast cereals, children's cereals, snacks, crumb coatings, confectionery or products for domestic animals, for example.

The components and their respective proportions can be chosen, and these substances can then be processed in the extruder under conditions of pressure, shear and temperature which are chosen to suit the characteristics of the product to be obtained, especially as a function of the water content and degree of expansion which is to be obtained after the die.

It is also possible to keep back ingredients which are sensitive to heat such as vitamins or coloring which form part of the composition of the product and not introduce them into the cooked mass until the second section.

It is possible to process in the first section of the extruder a substance which has a water content of 18–25%, to maintain this water content in the cooker and to reduce it to 14–22% in the second section by the release of steam in order to obtain an expanded product.

Such a cut expanded product may be dehydrated down to a water content of less than 5%.

It is possible to process in the first section of the extruder a substance which has a water content of 24–36%, and to maintain this water content in the cooker and in the second section in order to obtain a little- or non-expanded product.

Such a cut little- or non-expanded product may be converted into flakes by rolling and toasting.

The installation for carrying out the process according to the present invention therefore comprises a twin-screw extruder split into two distinct sections by a dynamic-separation device, a cooker connected in parallel with the first section and the second section, an extrusion die and a cutting device.

The dynamic-separation device may be produced in the form of a blocking zone where the twin-screw unit is of the opposite hand.

In this embodiment of the dynamic-separation device, provision may be made for an outlet from the first section of the extruder to straddle a compression zone and the blocking zone of the twin-screw unit.

Provision may be made for an outlet from the second section to be along the axis of or to the side of the downstream end of the extruder.

The outlet from the second section may lead directly to the die or be connected thereto by an appropriate duct.

Provision may be made for there to be a feed device for the first section, in the form of one or more feed openings provided in a barrel of the twin-screw unit, starting from the upstream end of the extruder. An opening for returning or inletting the cooked mass into the second section may be provided in the barrel of the twin-screw unit, near a transport zone following the blocking zone of the twin-screw unit.

It is possible to provide, near the inlet of the second section, a device for exhausting or releasing steam in the form of a vacuum suction pipe connected to a pump, an opening directly to the atmosphere or a back-pressure valve.

The cooker may be connected in parallel with the first section and the second section via appropriate ducts linking one inlet of the cooker to the outlet of the first section and one outlet of the cooker to the inlet of the second section.

It is possible to envisage a screw geometry which, for each section, is adapted to suit the substance to be processed and the product which is to be obtained. In particular, successive and/or alternating zones for transporting, compacting, compressing, kneading or mixing, may be envisaged. To define these various zones, the pitch of the screws, the space left empty for the substance to be processed, defined especially by the respective diameters of the shafts and of the flights, may be altered, or bilobes of varying shapes may be inserted. It is also possible to alter a subdivision of the barrel of the extruder in several independent compartments, the temperature of which may be adjusted individually by circulating a cooling or heating fluid.

Finally, the mechanical energy needed to process the food substance in the first section of the twinscrew unit, to process the cooked mass in the second section and to pass the mass through the die may be supplied by a single means of driving the screws of the twin-screw unit, such as an electric motor.

To pass the mass of cooked food substance through a die, this motor may be assisted or the load on it may be lightened using a positive-displacement pump such as a gear pump connected upstream of the die.

In the embodiment represented in FIG. 1, the present installation comprises a twin-screw extruder split into two distinct sections 1 and 2 by a dynamic-separation device 3, a cooker 4 connected in parallel with the first section 1 and with the second section 2, a die 5 and a cutting device, which is not represented.

Any conventional cutting device can be used, and these are well known to one of ordinary skill in the art.

The cooker may be produced in the form of a double-walled holding tube or of a double-walled horizontal cylindrical bath containing an Archimedean screw driven by a motor.

The twin-screw unit is driven by a motor 6 and is contained in a double-walled barrel subdivided into seven compartments i–vii, in each of which a cooling or heating fluid can be circulated.

In this installation, a substance A is introduced into the first section 1 of the extruder through a feed device comprising a feed opening 7 provided in the first compartment i of the barrel. The mass of substance A processed in the first section 1 leaves the extruder through an outlet 8 provided in the compartment iv of the barrel at the location of the dynamic-separation device 3 and connected to an inlet 41 off the cooker 4.

The mass cooked in the cooker leaves this cooker via an outlet 42 connected to an opening 9 for returning the cooked mass into the second section 2 of the extruder, this opening being provided in the fifth compartment v of the barrel, downstream of the dynamic-separation device 3.

At the inlet to the second section 2, the water content of the mass of cooked substance is reduced by means of a device for exhausting or releasing steam comprising a vacuum suction pipe 31 connected to a pump, which is not represented.

The mass of substance processed in the second section 2 leaves the extruder via an outlet 10 provided along the axis of its downstream end and connected to the die 5 on exit from which it can expand.

Figure 2:
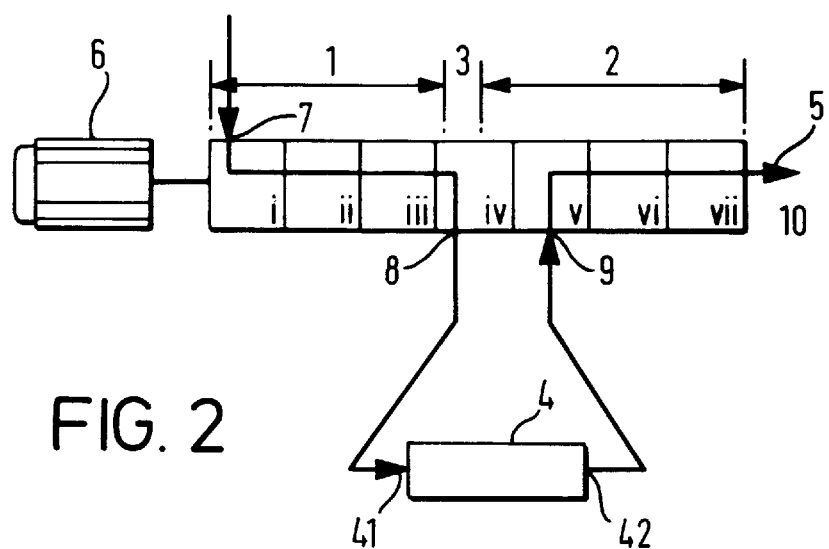
FIG. 2 is a diagram of a second embodiment of the invention, where the installation is used to prepare non-expanded products.

In the embodiment represented in FIG. 2, the present installation does not have a device for exhausting or releasing steam. In addition, by comparison with the embodiment represented in FIG. 1, it has differences as regards the geometry of the screws.

In this installation which is intended for the preparation of a little- or non-expanded product, the cooked mass from the cooker therefore has no steam exhausted and/or is not partially dehydrated as it enters the second section of the extruder.

In the embodiment represented in FIG. 3, the geometry of the screws is similar over a large part of the two sections 1 and 2 of the extruder, but has significant differences near the respective outlets from these sections.

In section 1, the screws have, in succession, a transport zone 11 (200/100), a compacting zone 12 (100/50), a compression zone 13 (100/33), an intermediate transport zone 14 (100/66), a compression zone 15 (100/35+200/28), a kneading zone 16 (100/–33), a compression zone 17 (100/35), an expulsion zone 18 (three-off 12.5 bilobes), and a blocking zone 3 (100/25).

In section 2, the screws have, in succession, a compacting zone 12 (50/50), a transport zone 11 (200/100), a compression zone 13 (100/33), a transport zone 14 (100/66), and a compression zone 15 (100/35+200/28+100/33+100/35).

The figures given in brackets give the length of the zone and the pitch in mm, for screws 88 mm in diameter and a distance of 72 mm between axes, the installation in this case comprising a CLEXTRAL BC-72 twin-screw extruder.

The geometry represented is not limited to these dimensions which are given by way of example. It may be transposed onto other models of extruder, especially the models BC-45 (screws 55 mm in diameter, with a distance of 45 mm between axes) or BC-92 (screws 115 mm in diameter, with a distance of 92 mm between axes) of the same series, for example.

The screw flights are preferably double, except for the opposite-handed flight in the blocking zone which is preferably single.

In contrast to the opposite-handed flight in the kneading zone 16 which on its periphery has cutouts for the passage of the processed mass, the opposite-handed flight in the blocking zone 3 has none in order that it can be as efficient as possible in fulfilling its role as a dynamic-separation device.

The outlet 8 from the first section 1 of the extruder has an axial oblong shape, in this case the shape of a figure eight, covering the entire length of the expulsion zone 18, straddling the compression zone 17 and the blocking zone 3.

The inlet opening 9 into the second section 2 also has an axial oblong shape, in this case also the shape of a figure eight.

In the embodiment represented in FIG. 4, the geometry of the screws in the second section 2 of the extruder is similar to that represented in FIG. 3. By contrast, the geometry of the screws in the first section 1 differs from this as regards the compression zone 15 (100/35+50/35+100/28 instead of 100/35+200/28). It also differs from the geometry of FIG. 3 as regards the zone 16 which here is a mixing zone formed of 10 bilobes 15 mm thick, instead of a kneading zone.

Figure 5:
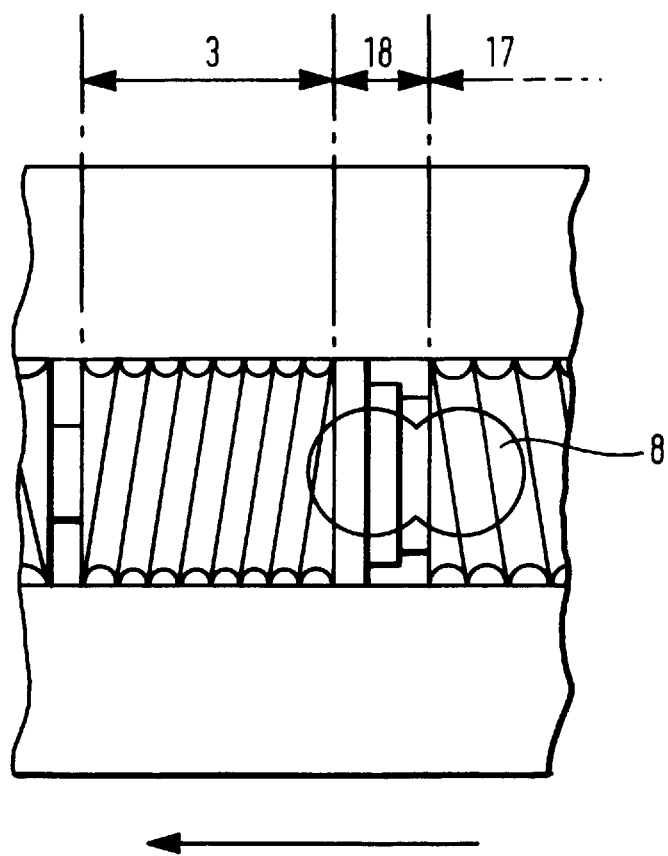
FIG. 5 is an enlarged detailed view of the dynamic separation device of the screws of FIGS. 3 and 4.

FIG. 5 shows in greater detail how the outlet 8 from the first section 1 of the extruder covers the entire length of the expulsion zone 18, straddling the compression zone 17 and the blocking zone 3. In particular it has been observed that it is essential for this opening to overlap the blocking zone 3, by a fraction of the length of the opening which corresponds approximately to 0.1–0.3 times the diameter of the screw, so that the substance taken up by the first flight or flights of the opposite-handed screw can be discharged and expelled effectively.

It is also important, to ensure good dynamic separation, for the blocking zone to be long enough, namely for it to have a length at least equal to the diameter of the screws, for an opposite-handed screw flight of between approximately ⅕ and ⅓ of this diameter.

The examples following examples below are given by way of an illustration of the process according to the present invention and of the products which can be obtained thereby. The percentages and parts therein are given by weight.

In these examples, the oil may be chosen, if need be, as a function of the physical purpose it has in the processed and extruded mass, and as a function of its taste, neutral or otherwise. It may be chosen from palm kernel oil, groundnut oil or corn oil.

In these examples too, the mixture of flours, the oil and the water are introduced, as appropriate, individually into the feed opening of the extruder.

EXAMPLE 1

Use is made of an installation like the one represented in FIGS. 1 and 3. The extrusion die is made in the form of a pierced plate having 4 cylindrical extrusion ducts 3.0 mm in diameter.

This installation is used to prepare breakfast cereals with the ingredients and under the conditions given in Tables 1a) and 1b) below.

Table 1a) gives the ingredients of a mixture of flours, their proportions in a typical mixture and the possible ranges of their proportions.

Table 1b) gives the quantities of the ingredients introduced into the extruder, the water content of the substance or of the processed mass and the operating conditions in each section.

TABLE 1a

Mixture of flours

| Ingredients | Typical mixture (%) | Possible range (%) |
|---|---|---|
| Cornflour | 20 | 0–80 |
| Wheat flour | 64 | 0–80 |
| Oatmeal | 10 | 0–80 |
| Sugar | 4.9 | 2–12 |
| Salt | 1 | 1–3 |
| Vitamins and trace elements | 0.1 | 0.1–0.2 |
| Total | 100 | 100 |

TABLE 1b

Operating conditions

| Parameter | Units | Value | Possible range |
|---|---|---|---|
| Mixture of flours | kg/h | 230 | 200–350 |
| Palm kernel oil | kg/h | 18 | 15–30 |
| Water | kg/h | 42 | 40–65 |
| Water content of mass 1st section | % | 23.2 | 18–25 |
| Rotational speed of screws | rpm | 360 | 250–450 |
| Temperature of mass 1st section | °C. | 145 | 140–170 |
| Pressure of mass 1st section | bar | 85 | 60–100 |
| Temperature of mass 2nd section | °C. | 158 | 150–180 |

TABLE 1b-continued

Operating conditions

| Parameter | Units | Value | Possible range |
|---|---|---|---|
| Pressure of mass 2nd section | bar | 112 | 80–130 |
| Current | A | 291 | 250–450 |
| Vacuum inlet 2nd section | mbar | 450 | 150–1000 |
| Reduced water content mass 2nd section | % | 18.5 | 14–22 |
| Residence time cooker | min | 35 | 20–45 |
| Temperature cooker | °C. | 130 | 120–150 |
| Density extruded product | g/l | 108 | 60–140 |

Breakfast cereals in the shape of small balls 8 to 12 mm in diameter with a good cooked taste are thus obtained.

EXAMPLE 2

Use is made of an installation like the one represented in FIGS. 2 and 4. The extrusion die is made in the form of a plate pierced with 12 cylindrical extrusion ducts 4.0 mm in diameter.

This installation is used to prepare breakfast cereals with the ingredients and under the conditions given in Tables 2a) and 2b) below.

Table 2a) gives the ingredients of a mixture of flours, their proportions in a typical mixture, and the possible ranges of their proportions.

Table 2b) gives the quantities of ingredients introduced into the extruder, the water content of the substance or of the processed mass and the operating conditions in each section. Steam is injected into the first section in the region of the intermediate transport zone 14. There is no vacuum suction at the inlet to the second section.

TABLE 2a

Mixture of flours

| Ingredients | Typical mixture (%) | Possible range (%) |
|---|---|---|
| Cornflour | 91 | 85–98 |
| Sugar | 6.9 | 0–12 |
| Salt | 2 | 0–3 |
| Vitamins and trace elements | 0.1 | 0.1–0.2 |
| Total | 100 | 100 |

TABLE 2b

Operating conditions

| Parameter | Units | Value | Possible range |
|---|---|---|---|
| Mixture of flours | kg/h | 240 | 200–350 |
| Steam | kg/h | 15 | 0–35 |
| Water | kg/h | 32 | 25–60 |
| Water content of mass | % | 25.6 | 24–36 |
| Rotational speed of screws | rpm | 195 | 140–250 |
| Temperature of mass 1st section | °C. | 125 | 115–140 |
| Pressure of mass 1st section | bar | 50 | 40–70 |
| Temperature of mass 2nd section | °C. | 91 | 80–100 |
| Pressure of mass 2nd section | bar | 71 | 50–80 |
| Current | A | 156 | 120–250 |

TABLE 2b-continued

Operating conditions

| Parameter | Units | Value | Possible range |
|---|---|---|---|
| Residence time cooker | min | 35 | 20–50 |
| Temperature cooker | °C. | 100 | 80–100 |
| Density extruded product | g/l | 685 | 600–750 |

Little- or non-expanded cereal balls with a diameter of approximately 5 mm that can be converted into flakes with a good cooked flavor by rolling and toasting are thus obtained.

What is claimed is:

1. A process for the preparation of a foodstuff by extrusion, which comprises introducing a food substance into a first section of a twin screw extruder, directing the food substance as it exits an outlet of the first section of the extruder to a cooker for cooking thereof, wherein the cooker is connected in parallel with the first section of the extruder; and reintroducing the cooked food substance into an inlet of a second section of the extruder for further processing, wherein the first and second sections of the extruder are configured to allow separate processing in each section, and extruding the food substance as it exits the second section, by passing it through a die to form an extruded foodstuff.

2. The process according to claim 1, in which the food substance has a water content of of 18–25% and is processed in the first section of the extruder, this water content is maintained in the cooker and reduced to 14–22% in the second section by the release of steam in order to obtain an expanded product.

3. The process according to claim 2, which further comprises cutting the extruded, expanded product and dehydrating the cut expanded product to a water content of less than 5%.

4. The process according to claim 1, in which the food substance has a water content of 24–36% before being processed in the first section of the extruder, and which further comprises maintaining this water content in the cooker and in the second section in order to minimize expansion of the extruded foodstuff.

5. The process according to claim 4, in which the extruded foodstuff is cut and converted into flakes by rolling and toasting.

6. A process for the preparation of a foodstuff by extrusion, which comprises introducing a food substance into a first section of a twin screw extruder, directing the food substance as it exits an outlet of the first section of the extruder to a cooker for cooking thereof, wherein the cooker is connected in parallel with the first section of the extruder; and reintroducing the cooked food substance into an inlet of a second section of the extruder for further processing, wherein the first and second sections of the extruder are separated by a dynamic separation device to allow separate processing in each section, and extruding the food substance as it exits the second section, by passing it through a die to form an extruded foodstuff.

7. The process according to claim 6, in which the dynamic-separation device comprises a blocking zone where the twin-screw extruder is of opposite hand such that the blocking zone is created as the twin screw extruder is operated.

8. The process according to claim 7, which further comprises providing a compression zone in the first section and positioning the first section outlet to straddle the compression zone and the blocking zone.

9. The process according to claim 6, which further comprises configuring the first and second sections to each include two compression zones separated by a transport zone to assist in processing of the food substance.

10. The process according to claim 9, wherein the first and second sections each include a compacting zone prior to the two compression zones, and the first section includes a mixing or kneading zone and a third compression zone following the two compression zones to assist in processing of the food substance.

11. The process according to claim 10, which further comprises positioning each zone along a pair of common longitudinal screws, the first section including an outlet having an axial oblong shape to allow the foodstuff to pass to the cooker, the second section including an inlet having an axial oblong shape to receive the cooked foodstuff from the cooker, and the dynamic separation device having a length that is at least as long as the diameter of the screw.

12. The process according to claim 2, which further comprises providing the second section with a device for exhausting or releasing steam as the water content of the cooked foodstuff is reduced.

13. The process according to claim 12, wherein the exhausting device is provided as a vacuum suction pipe located near the inlet of the second section.

14. The process according to claim 11, wherein each screw has a diameter of between 55 and 115 mm and the screws are separated by a distance of between 45 and 92 mm.

15. The process according to claim 1, further comprising cutting the extruded foodstuff before processing it into a final product.

* * * * *